United States Patent [19]
Burgdorf et al.

[11] Patent Number: 4,883,328
[45] Date of Patent: Nov. 28, 1989

[54] BRAKE SYSTEM WITH ANTI-LOCKING AND/OR TRACTION SLIP CONTROL

[75] Inventors: Jochen Burgdorf, Offenbach-Rumpenheim; Lutz Weize, Mainz, both of Fed. Rep. of Germany

[73] Assignee: Alfred Teves GmbH, Frankfurt am Main, Fed. Rep. of Germany

[21] Appl. No.: 247,019

[22] Filed: Sep. 20, 1988

[30] Foreign Application Priority Data

Sep. 24, 1987 [DE] Fed. Rep. of Germany ....... 3732161

[51] Int. Cl.$^4$ ................................................. B60F 8/32
[52] U.S. Cl. ..................................... 303/116; 303/113; 303/119
[58] Field of Search ............... 303/116, 119, 113, 114, 303/115, 105, 106

[56] References Cited

U.S. PATENT DOCUMENTS

| | | | |
|---|---|---|---|
| 4,141,595 | 2/1979 | Leiber | 303/116 |
| 4,653,813 | 3/1987 | Burgdorf | 303/119 X |
| 4,678,243 | 7/1987 | Leiber | 303/119 |
| 4,685,747 | 8/1987 | Belart et al. | 303/114 |
| 4,715,663 | 12/1987 | Hattori et al. | 303/116 X |
| 4,729,611 | 3/1988 | Kircher et al. | 303/116 |
| 4,779,937 | 10/1988 | Burgdorf et al. | 303/116 X |
| 4,790,608 | 12/1988 | Burgdorf et al. | 303/116 X |

FOREIGN PATENT DOCUMENTS

| | | |
|---|---|---|
| 2178499 | 7/1987 | Fed. Rep. of Germany . |
| 3601914 | 7/1987 | Fed. Rep. of Germany . |
| 3607366 | 9/1987 | Fed. Rep. of Germany . |
| 3607367 | 9/1987 | Fed. Rep. of Germany . |
| 3619487 | 12/1987 | Fed. Rep. of Germany . |
| 2192684 | 1/1988 | Fed. Rep. of Germany . |
| 3527566 | 1/1988 | Fed. Rep. of Germany . |
| 3624344 | 1/1988 | Fed. Rep. of Germany . |
| 3624722 | 1/1988 | Fed. Rep. of Germany . |
| 3627809 | 2/1988 | Fed. Rep. of Germany . |
| 3705311 | 9/1988 | Fed. Rep. of Germany . |
| 3542419 | 10/1988 | Fed. Rep. of Germany . |
| 2593129 | 7/1987 | France . |
| 2201208 | 8/1988 | United Kingdom . |

*Primary Examiner*—Robert J. Oberleitner
*Assistant Examiner*—Matthew C. Graham
*Attorney, Agent, or Firm*—Robert P. Seitter

[57] ABSTRACT

A brake system with anti-locking and/or traction slip control is disclosed including a brake pressure generator, an auxiliary pressure supply system having one or more bypass-regulated hydraulic pumps, and electrically controllable multi-way valves in the brake conduits. An auxiliary pressure supply system is connected either directly or through multi-way valves to the wheel brakes and, through separating valves, to the brake pressure generator. Inserted in bypass conduits which are connected in parallel to the hydraulic pumps, are additional multi-way valves which are normally closed in the rest position but which are reswitchable to an open position and by way of which the pressure in the auxiliary pressure supply system is controllable to modulate the brake pressure in the wheel brakes.

14 Claims, 4 Drawing Sheets

BRAKE SYSTEM WITH ANTI-LOCKING AND/OR TRACTION SLIP CONTROL

BACKGROUND OF THE INVENTION

The present invention relates to an automotive brake system with anti-locking and/or traction slip control. In this system, the wheel brakes of the regulated wheels are in communication with a brake pressure generator through pressure fluid paths. These paths are provided with electrically controllable multi-way valves open in one switch position (preferably in their rest position) and switchable to close and block the pressure fluid passage. A controllable auxiliary pressure supply system and a pressure reservoir are connected to the brake pressure generator and electronic circuits are provided for processing electric signals representing the wheel rotational behavior to generate electric brake pressure control signals to be supplied to the multi-way valves and to the auxiliary pressure supply system.

A variety of brake systems of the afore-described type are already known in the art. For example, German publication DE-OS No. 36 01 914 describes a brake system with anti-locking control, the auxiliary pressure supply system of which comprises a hydraulic pump and regulating valves limiting the auxiliary pressure to a value in proportion to the brake pedal force. Central valves in the interior of the master cylinder of this system open and close a pressure fluid conduit leading from the working chamber or chambers of the master cylinder to a pressure reservoir to regulate the auxiliary pressure. Upon commencement of the anti-locking control, the hydraulic pump is actuated thereby feeding pressure fluid to the working chambers of the master cylinder to reposition the master cylinder pistons. In the end or initial position of the pistons, the regulating central valves are opened to an extent such that a pressure proportional to the pedal force is maintained in the working chambers even though during the pressure control, pressure fluid is discharged through the output valves, from the wheel brakes into the pressure reservoir. A disadvantage with this system is that there is a substantial influence on the pistons in the master cylinder when the hydraulic pump is turned on. This influence results in a near immediate, abrupt complete restoring of the brake pedal which is objectionable to the driver.

Also, it is known to adjust the auxiliary pressure in brake systems with the aid of a regulating valve disposed externally of the master cylinder to a value proportional to the pedal force. By using separating valves to interrupt, in case of control, the connection leading from the auxiliary pressure source and the wheel brakes to the master cylinder any effect on the master cylinder and, hence, on the brake pedal, can be precluded. Additionally, separating valves of this type when used in a traction slip control system in which the working chambers of the master cylinder are in communication with the pressure reservoir, prevent pressure fluid from being discharged through the master cylinder (see, e.g., German Patent Application Nos. P 36 24 722.7; P 36 24 344.2; P 36 27 566.2). In all cases, to achieve brake pressure decrease during a skid control phase, pressure fluid is discharged with the aid of a separate outlet valve from the wheel brake of the wheel concerned to the pressure reservoir of the brake system while the pressure fluid conduit from the pressure source to the wheel brake is blocked. The control of the auxiliary pressure is thereby not influenced.

Also, it is known in the art in connection with a brake system disclosed in No. P 37 05 311.6 to have the auxiliary pressure, through regulating valves, the control input of which is in communication with the working chambers in the master cylinder, controllable in proportion to the pedal force, and to provide separating valves in the pressure fluid conduit leading from the auxiliary pressure source to the master cylinder, to directly connect a wheel brake to the pump outlet. In addition, that system provides for a bypass conduit in which a multi-way valve is located and through which the pump output can be connected to the pressure reservoir. Since regulation of the auxiliary pressure takes place externally of the master cylinder and since the hydraulic connection to the master cylinder during skid control can be isolated there are no undesirable effects on the brake pedal.

SUMMARY OF THE INVENTION

It is accordingly an object of the present invention, to provide a brake system having a comparatively simple construction, involving relatively low manufacturing costs, which does not produce undesired effects on the brake pedal during brake regulation.

It has been found that this object can be achieved in accordance with the present invention wherein the auxiliary pressure supply system comprises one or more bypass-controlled hydraulic pumps connected to the wheel brakes either directly or through multi-way valves which are reswitchable to blocking positions and with separating valves (such as multi-way valves) which are switchable to blocking positions provided in the pressure fluid conduits leading to the brake pressure generator. The invention further provides for the pressure fluid to be dischargeable into the pressure reservoir to achieve pressure decrease during the regulating phase through bypass conduits including the multi-way valves connected in parallel to the hydraulic pumps.

The multi-way valve provided in the bypass conduit, preferably, is a 2-way/2-position valve closed in its normal position which is switchable to an open position.

The desired reduction in the manufacturing efforts as compared with conventional brake systems is attained by the invention because the auxiliary pressure is regulated and the brake pressure in the wheel brake cylinders, during the regulating phases, is modulated through the bypass conduits with the aid of the multi-way valves in the bypass conduits. Reaction on the pistons in the master cylinder of the brake pressure generator and on the brake pedal is, accordingly, precluded or reduced to an extent such that there is no unacceptable feedback to the driver through the pedal.

According to an advantageous embodiment of the invention, the brake pressure generator comprises two separate hydraulic brake circuits to which the front and rear wheel brakes are diagonally connected and to each of which is respectively associated a bypass-regulated hydraulic pump. Both pumps are either jointly or individually driven by a common electric motor.

In a front-axle/rear-axle divided-type dual-circuit brake system, in which a particularly small number of valves is required, the wheel brakes of the front wheels, respectively through 2-way/2-position valves, which in their normal positions are open are connected to a common brake circuit while the wheel brakes of the rear wheels are connected directly to the second brake circuit. Since, for driving stability reasons, the brake pressure in the rear wheels is commonly regulated to a lower pressure, the elimination of inlet valves in the pressure fluid path leading to the rear wheels brakes does not deteriorate the quality of regulation, while individual regulation of the two front wheel brakes is of substantial advantage.

According to another advantageous embodiment of this invention, the brake pressure generator comprises either a single or dual circuit master cylinder including working chambers to which the wheel brakes are connected, and master cylinder valves which connect the working chambers to the pressure reservoir. The master cylinder valves are in the form of regulating valves and limit the auxiliary pressure to a value in proportion to the pedal force. Advantageously the master cylinder valves are found as regulating central valves through which pressure fluid from the auxiliary pressure supply system can be fed to the master cylinder to restore the master cylinder pistons to their initial position, or discharged to the pressure reservoir such that the pressure in the working chamber does not exceed a value in proportion to the pedal force.

According to an important feature of this invention, a switch is provided which is actuated in response to movement of the master cylinder piston when the pistons and the brake pedal are moved under the effect of the auxiliary pressure to produce a signal to operate the valve in the bypass conduit to effect a reduction of the auxiliary pressure and, hence, limit the return stroke of the pedal.

In another embodiment of this invention, one or more differential pressure switches are provided for comparing the pressure in the master cylinder working chambers with the auxiliary pressure to regulate, with the separating valves closed, the auxiliary pressure in the hydraulic circuit of the auxiliary pressure supply system in response to the pressure in the master cylinder, for example, to a value in proportion to the pedal force. Since separating valves are provided in the pressure fluid conduit leading from the auxiliary pressure source and from the wheel brakes to the master cylinder, traction slip control can be readily provided because, by reswitching the separating valves, pressure fluid flow through the non-pressurized master cylinder can be precluded. However, it is feasible to connect a pressure limiting valve in parallel at least to the separating valves disposed in the pressure fluid paths leading to the driven wheels to preclude the possibility of an excessive auxiliary pressure from affecting the pressure modulation.

According to the invention, several wheel brakes can be connected to a brake circuit, and the brake pressure in the individual wheel brakes, with the aid of multi-way valves provided in the pressure fluid connections, is successively varied in timed relationship according to a time multiplex process.

Advantageously, the invention provides for combining a variety of principles and features resulting in substantial savings, especially in regard to the valves. Moreover, the effects of the control on the brake pedal is low, resulting in a comfortable pedal feel. Both the regulation of the auxiliary pressure and the brake pressure modulation, and in particular the brake pressure decrease during detection of a brake locking tendency, are performed through a single bypass conduit for each brake circuit in which is provided a multi-way valve. A pressure proportional to the pedal force is generated in the auxiliary pressure supply system by regulating central valves, by way of switches or pressure differential measurements in conjunction with the regulation of the pressure fluid flow through the bypass conduit. By these means, the pedal characteristic can be adapted to different requirements or desired effects. The brake pressure in the two wheel brakes, can also be modulated according to a time multiplex process.

BRIEF DESCRIPTION OF THE DRAWING

Further features and advantages of the invention will be apparent from the following Detailed Description of a Preferred Embodiment with reference to the Drawing wherein.

DETAILED DESCRIPTION OF A PREFERRED EMBODIMENT

Figure 1:
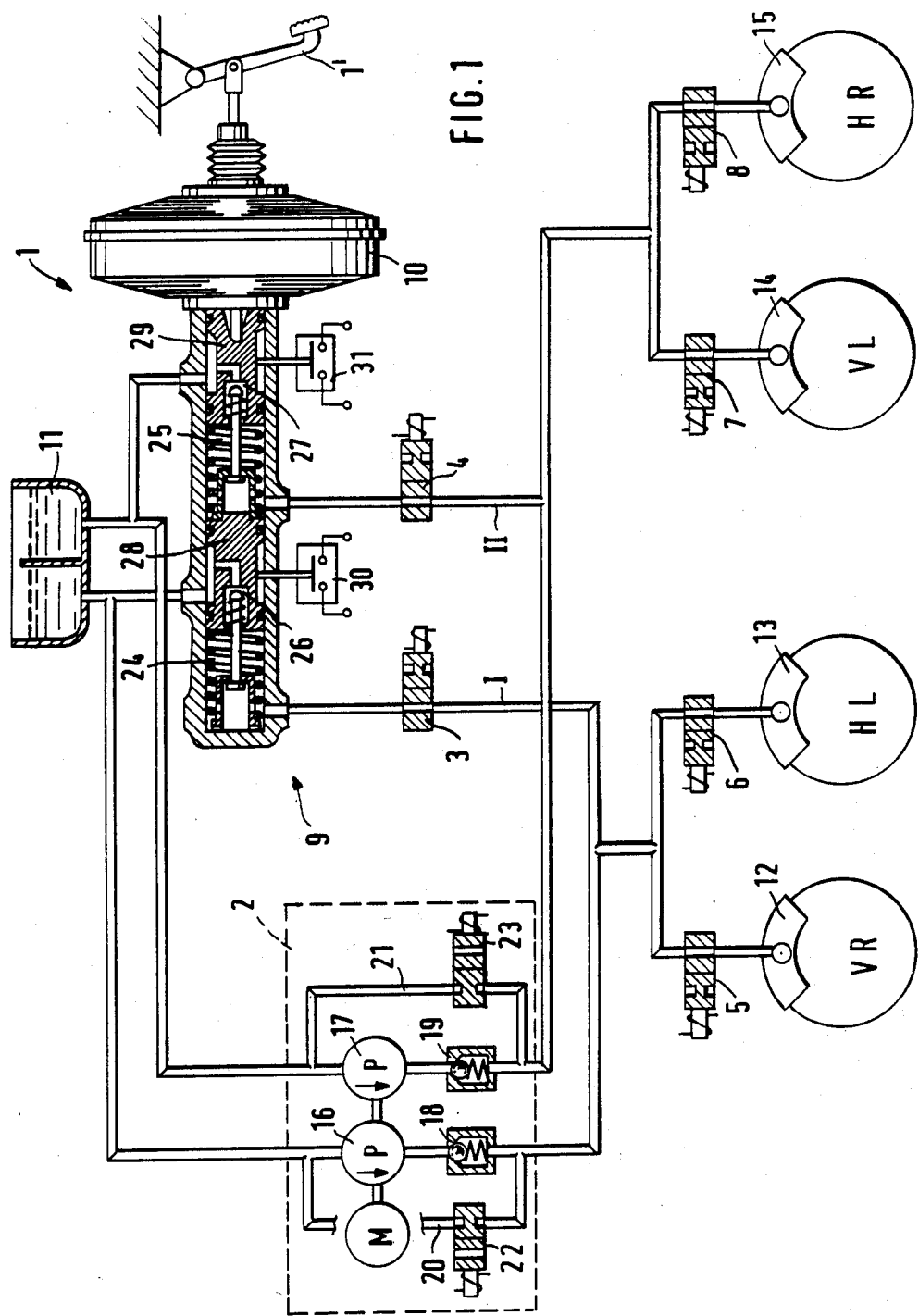
FIG. 1 is a schematic diagram of the major hydraulic components of a brake system provided with anti-locking regulation according to the invention.

According to FIG. 1, the brake system of the invention substantially comprises a pedal-operated brake pressure generator 1, an auxiliary pressure supply system 2, separating valves 3, 4 and wheel valves 5, 6, 7 and 8. The brake pressure generator 1, in turn, comprises a tandem master cylinder 9 including a brake force booster 10 coupled thereto such as a servo device. For the master cylinder 9 and the auxiliary pressure supply system 2, a common pressure compensating and pressure fluid reservoir 11 is provided.

Diagonally connected to the two hydraulically separated brake circuits I, II of the tandem master cylinder are the automotive wheels. The brake circuit I leads to the wheel brakes 12, 13 of the righthand front wheel VR and the lefthand rear wheel HL, whereas brake circuit I1 leads to the wheel brakes 14, 15 of the two other automotive wheels VL, HR.

The auxiliary pressure supply system is provided with two hydraulically separated circuits respectively comprising a hydraulic pump 16 and 17, an associated check valve 18 and 19, respectively, and bypass conduits 20 and 21. The hydraulic pumps 16, 17 of the two circuits are actuated by a common drive motor M. Provided in the bypass conduits are respectively multi-way valves 22, 23 which are closed in their normal or at rest position and which are reswitchable to an open passage position. The multi-way valves, after energizing and switching, quasi short-circuit the delivery side of the pump with the intake side of the pump which, in turn, is in communication with the reservoir 11.

All wheel brakes 12, 13, 14 and 15 are, respectively through a normally open inlet valve, such as multi-way valves 5, 6, 7 and 8 in communication with the brake circuits I, II, and are, respectively through a separating valve 3, 4, in communication with the master cylinder 9 of the brake pressure generator 1. The two hydraulically separated circuits of the auxiliary pressure supply system 2, moreover, are connected in parallel to the master cylinder 9 to the input side of the wheel valves 5, 6, 7 and 8 and, hence, to the wheel brakes 12, 13, 14 and 15. Brake pressure can thus be applied to the wheel brakes both through the master cylinder 9 and through the supply system 2.

To generate a pressure in proportion to the pedal force in the working chambers 24, 25 of the tandem master cylinder 9, master cylinder central valves 26, 27 are provided. The central valves are similar to those described for example, in the above-mentioned publication No. P 36 01 914 and are configured as regulating central valves which, after retraction of the master cylinder pistons 28, 29 into the initial position, release the pressure fluid conduit leading from the working chambers 24, 25 to the reservoir 11, however, only to an extent such that the auxiliary pressure supplied from the source 2 is limited to a pressure proportional to the pedal force.

Moreover, switches 30, 32, shown in FIG. 1, generate an electrical signal when the master cylinder pistons 28, 29 have moved a predetermined distance. As symbolically illustrated in FIG. 1 the switch pins are disposed in radial relationship to the piston axis. As shown, there are oblique edges, on the pistons 28, 29.

The switches 30, 31 and the responsive signals supplied by the switches, in the practice of the invention, can be used for different functions of which some will be described hereinafter.

If the pressure in the working chambers 24, 25, with the aid of the central valves 26, 27, is controlled to the value in proportion to the pedal force, the switches 30, 31 will serve to monitor the proper function.

With the aid of the switches 30, 31 in conjunction with the additional multi-way valves 22, 23 in the bypass conduits 20, 21 of the hydraulic pumps 16, 17, positioning of the brake pedal 1' can be attained or complete restoring of the pedal to the initial position can be precluded upon commencement of a skid control. For this purpose, upon commencement of the skid control and turning on of the hydraulic pumps 16, 17, pressure fluid supply from the supply system 2 to the working chambers 24, 25 will be admitted only on response of the switch 30 or 31 to reopen the circuit leading through the switch contacts.

Thereupon, by driving the valves 22, 23, a further rise in the auxiliary pressure and, hence, further restoring of the brake pedal 1', is precluded. Different pedal characteristics of a quasi continuous characteristic pattern can be realized by a pulse-type driving of the valves 22, 23 in the bypass conduits 20, 21 and by varying the pulse spaces or pulse widths. By electronic delay lines, multiple contact switches, a plurality of actuating ramps etc., several functions, e.g., monitoring and positioning functions, can be combined or different reactions in control operations at either very high or a very low friction coefficient attained.

The point in time at which to switch on the auxiliary pressure supply system 2 and the hydraulic pumps 16, 17, respectively, is influenced by the switching position of the switches 30, 31 and the distance covered by the pistons 28, 29, respectively. At a low friction coefficient, i.e., on a slippery road, it could, for example, be reasonable to turn on the auxiliary pressure supply only after the pistons have covered a predetermined distance. Prior to that point of response, it will not yet be necessary to replenish the quantity of low pressure fluid discharged in an anti-locking control with the aid of hydraulic pump 16, 17.

The operation of the brake system according to FIG. 1 is as follows:

In normal, uncontrolled decelerating operations, both the separating valves 3, 4 and the wheel valves 4, 5, 6, 7 and 8 remain in their at rest position wherein they are open to the passage of pressure fluid. The auxiliary pressure supply system 2 remains in the switched-off position. Through the auxiliary pressure supply system 2, no pressure fluid can flow into the reservoir 11 as the bypass conduits 20, 21, through valves 22, 23 are closed in their rest position, and the pump conduits are interrupted through the check valves 18, 19. However, should, in the event of a very strong deceleration without wheel slip, the switches 30 or 31 respond, there could result a switching-on of the hydraulic pumps 16, 17 to maintain, a residual volume in the working chambers 24, 25 of the tandem master cylinder 9.

Once a wheel exhibits a locking tendency, a brake pressure decrease is initiated. For this purpose, the separating valve 3 or 4 in the brake circuit connected to the wheel tending to lock is reswitched to the closed position while the valves 22 or 23, in the corresponding bypass conduit 20 and 22, respectively, is reswitched to the open position. By energizing the inlet valve, through which the second, stable wheel is in communication with the same brake circuit, a pressure decrease in the wheel brake of the wheel is precluded. Consequently, pressure fluid can only flow from the wheel tending to lock through the wheel valve which is switched open through the bypass conduit, to the reservoir 11. Once the desired reduced pressure level—or an intermediate step—computed by the electronic unit (not shown) is reached by reswitching the respective wheel valve, the reduced pressure level can be maintained and, the brake pressure on the second wheel of the same brake circuit can be re-increased or raised or lowered to another pressure level optimum for that wheel. The regulation in the individual brake circuits, is accordingly effected according to the time multiplex principle, that is in a time staggered relationship.

Additionally, upon commencement of skid control, the drive motor M and, hence, the hydraulic pumps, 16, 17, are put into operation. Once the pressure fluid conduit, through the bypass lines 20 or 21, is re-interrupted the auxiliary pressure is made available though the supply system 2. The separating valves 3 or 4, in the embodiment shown, are closed only during pressure decrease so that pressure fluid flows into the working chambers 24, 25 of the master cylinder 9 through the separating valves, when the auxiliary pressure exceeds the pressure in the working chambers 24, 25. In a manner already described, the pistons 28, 29 are first restored until either of the switches 30 or 31 respond by reopening. By driving the valves 22, 23 in the bypass conduits 20, 21, to limit the pressure in the working chambers 24, 25 to a value proportional to the pedal force, by response to the switches 30, 33, determining the return-stroke and the position of the pistons 28, 29 and of the pedal 1', respectively, during regulation is determined. In addition or alternately the pressure limitation in the chambers 24, 25 can also be effected with the aid of central valves 26, 27 provided that the valves are configured as regulating valves. However, the regulating effect of the valves will begin only when the pistons 26, 27, and thus the pedal 1', are restored completely to their initial position.

Figure 2:
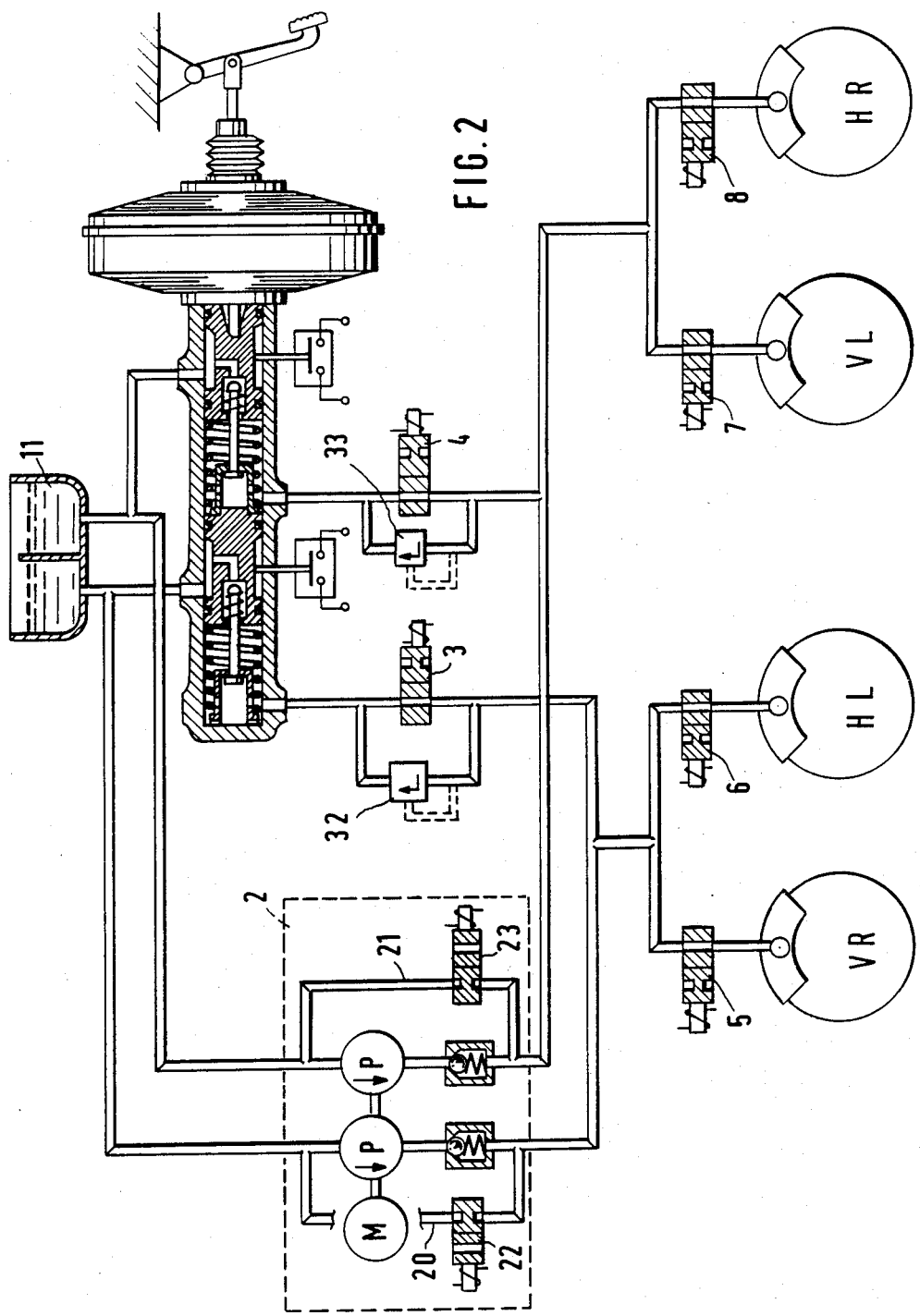
FIG. 2 is a schematic diagram of an alternative embodiment of a hydraulic brake system also suitable to control traction slip for an automotive vehicle having a diagonally divided brake circuit.

FIG. 2 is distinguished from the embodiment of FIG. 1 in that the pressure limitation valves 32, 33 are connected in parallel to the separating valves 3, 4. After blocking the pressure fluid conduit from the auxiliary pressure source to the master cylinder it is possible to control - with brake 1 not applied—the brake pressure from the auxiliary pressure supply system 2 into the brakes of the driven wheels to counteract the spin of one or both wheels during vehicle start or acceleration. For traction skid control of this type, the maximum pressure, with the aid of pressure limiting valves 32, 33, is limited to, for example, 80 bar. The separating valves 3, 4, during traction skid control, are reswitched to the closed position, as are the wheel valves 6, 8 of the non-driven automotive wheels in the case of a front wheel drive.

Also, it would be possible to limit the auxiliary pressure with the aid of valves 22, 23 in the bypass conduits 20, 21.

Figure 3:
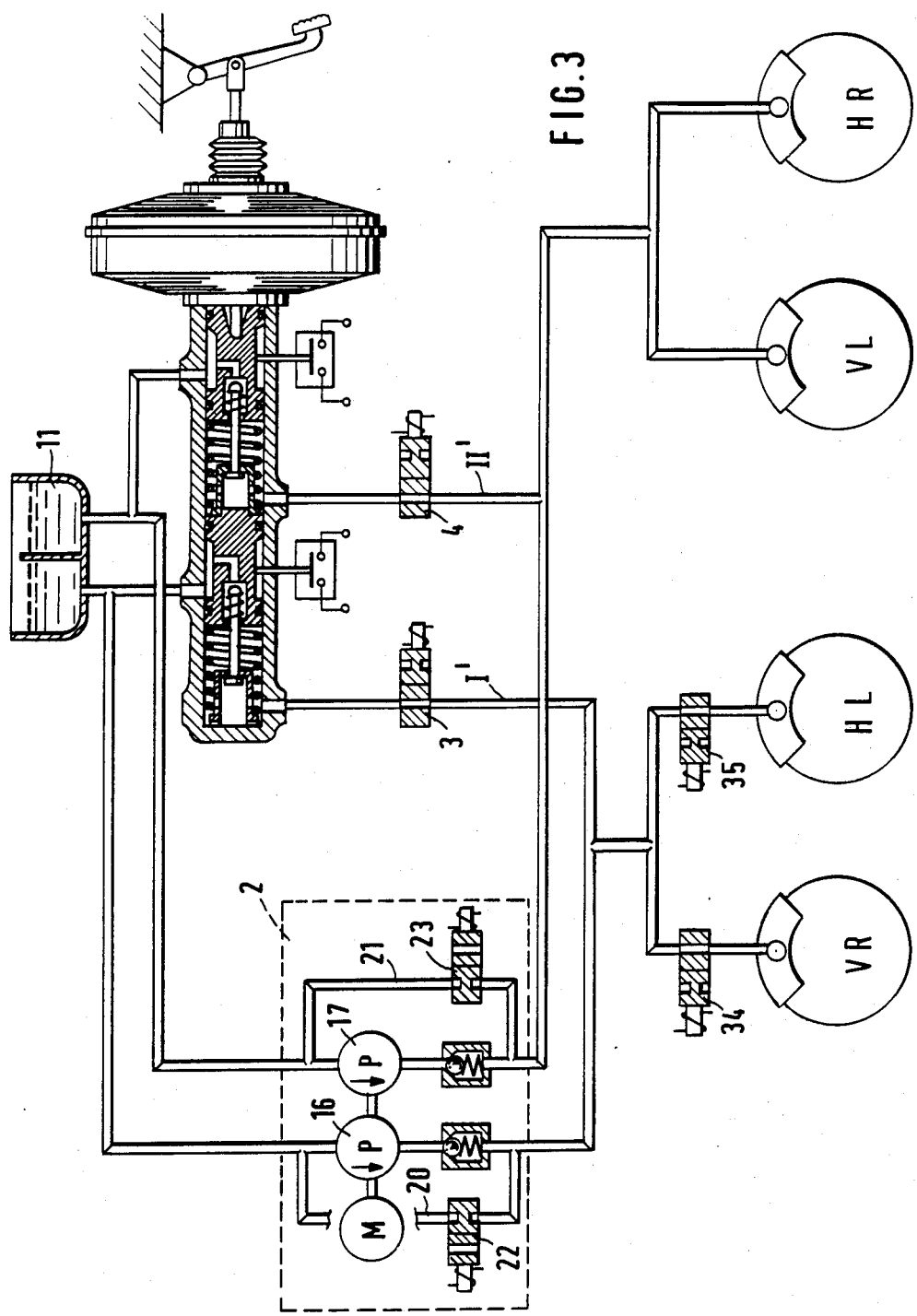
FIG. 3 is a schematic diagram of a brake system having a front-axle/rear-axle divided brake circuit.

FIG. 3 shows the arrangement of the valves in an anti-locking brake system of the type as provided by the invention with a front and rear brake circuit division. Connected to one brake circuit I' are the two front wheels VR, VL, through separate multi-way valves, such as 2-way/2-position valves 34, 35, thereby permitting individual brake pressure control in the wheel brakes of the front wheels in the manner as described above.

The two rear wheels HR, HL, are connected directly, and without the provision of wheel valves, to the second brake circuit II' of the brake system. Modulation of the brake pressure in the wheel brakes of the rear wheels, hence, will be possible only through the bypass conduit 21 and through the multi-way valve 23 in the bypass of the hydraulic pump 17. Accordingly, the same pressure will always prevail in the two wheel brakes of the rear wheels. However, this does not present any disadvantage because, in the majority of cases, the brake pressure, on the rear axle, is regulated in phases in accordance with the select-low principle to insure a high driving stability. In the embodiment according to FIG. 3, the valve requirements are minimized.

However, when using the brake system according to FIG. 3 for traction slip control in automotive vehicles with rear axle drive, wheel valves would, again, have to be provided in the pressure fluid connection conduits leading to the two rear wheel brakes.

Figure 4:
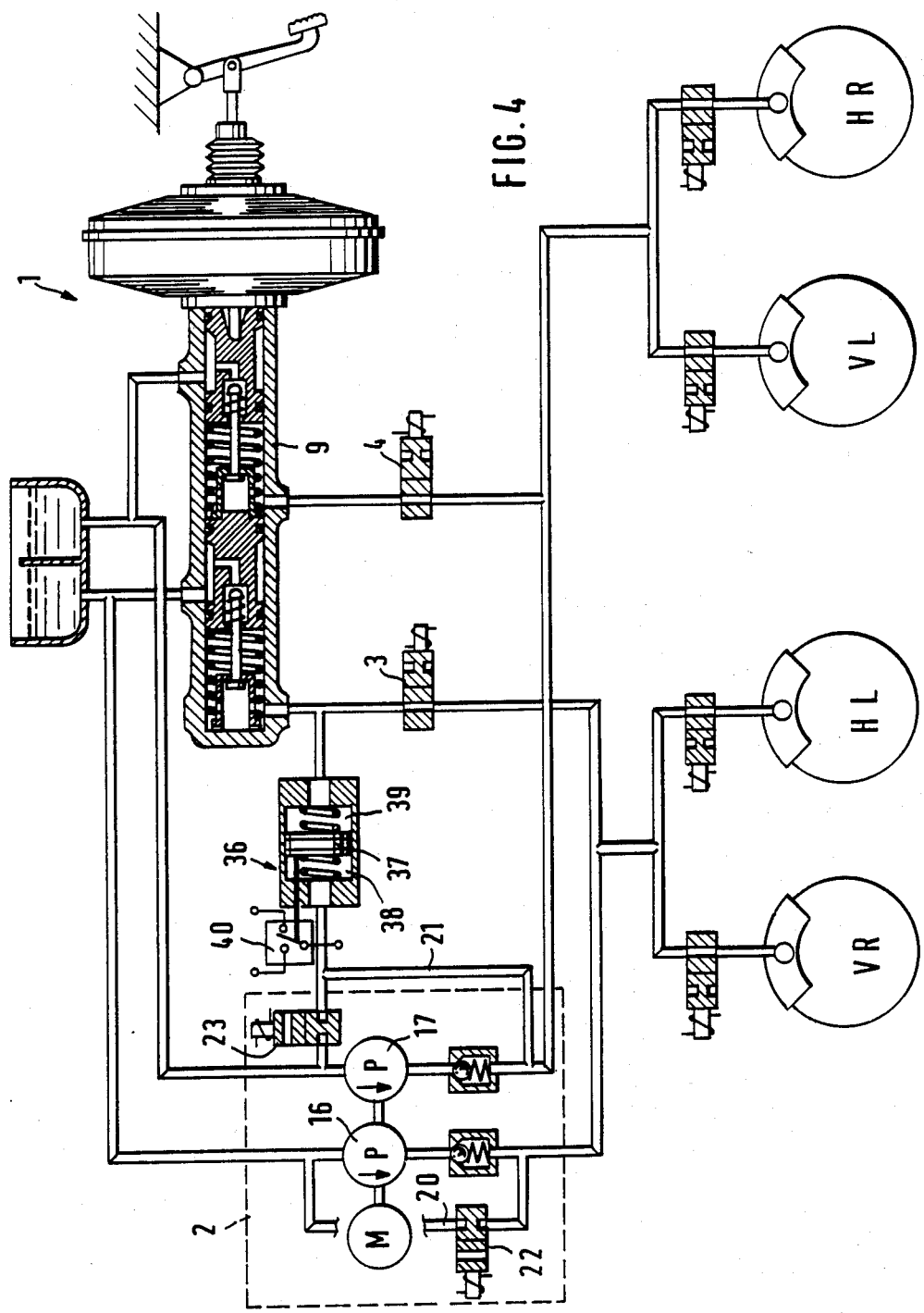
FIG. 4 is a schematic diagram of a brake system provided with a differential pressure switch to control the auxiliary pressure.

The embodiment according to FIG. 4 is distinguished from the previously described brake systems in that there is provided a differential pressure switch 36 for comparing the pressure in the master cylinder 9 with the auxiliary pressure of the auxiliary pressure supply system 2. A piston 37 in the interior, in the rest position thereof, takes a central position. When a predetermined pressure difference occurs between the two chambers 38, 39 of the differential pressure switch 36, an electric signal is released through an electrical switch 40 which is actuated upon axial displacement of the piston 37, which signal, through the electronic unit (not shown) causes the pump motor M and/or the valves 22, 23 in the bypass conduits 20, 21 of the auxiliary pressure supply system 2 to be turned on and off. With the aid of the differential pressure switch 36 and the electro-switch 40, the auxiliary pressure can thus be regulated in the desired manner in response to the pressure in the master cylinder 9 which is hydraulically separated in this phase by energizing the separating valves 3, 4.

If two differential pressure valves 36 are provided in the brake system, it is possible for the auxiliary pressure in the two hydraulically separated circuits of the pumps 16, 19 to be varied independently of one another.

Brake systems of the afore-described type, moreover, include wheel sensors which generate electric signals representative of the wheel rotational behavior. In addition, electric circuits are required for processing the signals from the wheel sensors and to generate signals for driving the various multi-way valves and for switching on the auxiliary pressure supply system and the pump motor, respectively. Hardware-impleted circuits and microcomputers are suitably employed. As such components are known per se and are not required for the understanding of the present invention, a detailed description and illustration thereof is not required.

What is claimed is:

1. An automotive brake system including slip control comprising pressure fluid conduits connected to a brake pressure generator and wheel brakes, electrically controllable multi-way valves in said pressure fluid conduits, said multi-way valves normally open in one switching position and reswitchable to block pressure fluid passage during a regulating phase, at least one normally open separating valve in said pressure fluid conduit, said normally open separating valve being switchable to block said pressure fluid conduit during the regulating phase, a controllable auxiliary pressure supply system, a pressure compensating reservoir connected to the brake pressure generator and to the auxiliary pressure supply system, electronic circuit means for processing electric signals from wheel sensors representing wheel rotational behavior and for generating electric brake pressure control signals for operating the multi-way valves, the separating valve and the auxiliary pressure supply system, said auxiliary pressure supply system comprising at least one bypass-regulated hydraulic pump connected to the wheel brakes, and a bypass conduit connected in parallel to the hydraulic pump including at least one additional multi-way valve dischargeable into the pressure compensating reservoir and differential pressure detecting means coupled to said brake pressure generator for comparing the pressure in said brake pressure generator with the auxiliary pressure of said auxiliary pressure supply system and means responsive to said differential pressure detecting means to control said auxiliary pressure supply system.

2. The brake system according to claim 1, wherein said additional multi-way valve in said bypass conduit is a 2-way/2-position valve normally closed in a basic position and reswitchable to an open position.

3. The brake system according to claim 1, wherein the brake pressure generator includes two hydraulic separated brake circuits to which the wheel brakes are connected in a diagonal front axle/rear axle division and there are two bypass-regulated hydraulic pumps, one connected to each circuit.

4. The brake system according to claim 3, wherein both hydraulic pumps are actuable by a common electric motor.

5. The brake system according to claim 1, wherein said system is a front axle/rear axle divided type dual-circuit brake system, wherein each of the wheel brakes of the front wheels are connected to separate normally open switchable to a closed position 2-way/2-position valves, connected in one brake circuit, and the wheel brakes of the rear wheels are connected directly to the second brake circuit.

6. The brake system according to claim 1, wherein the auxiliary pressure supply system can be switched on by a slip regulating signal from said circuit means.

7. The brake system according to claim 1, wherein the auxiliary pressure supply system can be alternatively switched on by a signal derived from a brake actuating force, from a brake pressure indicative of a brake pedal travel.

8. The brake system according to claim 1, wherein the brake pressure generator comprises a master brake cylinder including working chambers to which the wheel brakes are connected and including master cylinder valves connecting the working chambers to the pressure compensating reservoir, wherein the master cylinder valves are in the form of regulating valves adapted to limit the auxiliary pressure to a value in proportion to a pedal force.

9. The brake system according to claim 8, wherein the master cylinder valves define regulating central valves, through which, pressure fluid from the auxiliary pressure supply system passes to restore master cylinder pistons in the master cylinder into an initial position, said pressure fluid is dischargeable into the pressure compensating reservoir, thereby permitting the pressure in the working chambers to be limited to the value in proportion to the pedal force.

10. The brake system according to claim 9, wherein a switch is provided in said master cylinder which is actuable in response to the movement of the master cylinder piston and which upon restoring of the pistons to said initial position under the effect of the auxiliary pressure, releases a signal for causing a reduction in the auxiliary pressure and, hence, a limitation in pedal return stroke.

11. The brake system according to claim 10, wherein upon actuation of the switch, the additional multi-way valve in the bypass conduit of the associated hydraulic pump is actuated.

12. The brake system according to claim 1, including pressure limitation valves connected in parallel to the separating valves in the pressure fluid conduits leading to the driven wheels providing for traction skid control.

13. The brake system according to claim 1, wherein said multi-way valves are connected to a common brake circuit, and operated in a timed successive relationship.

14. An automotive brake system including slip control control comprising pressure fluid conduits connected to a brake pressure generator and wheel brakes, electrically controllable multi-way valves in said pressure fluid conduits, said multi-way valves normally open in one switching position and reswitchable to block pressure fluid passage during a regulating phase, at least one normally open separating valve in said pressure fluid conduit, said normally open separating valve being switchable to block said pressure fluid conduit during the regulating phase, a controllable auxiliary pressure supply system, a pressure compensating reservoir connected to the brake pressure generator and to the auxiliary pressure supply system, electronic circuit means for processing electric signals from wheel sensors representing wheel rotational behavior and for generating electric brake pressure control signals for operating the multi-way valves, the separating valve and the auxiliary pressure supply system, said auxiliary pressure supply system comprising at least one bypass-regulated hydraulic pump connected to the wheel brakes, and a bypass conduit connected in parallel to the hydraulic pump including at least one additional multi-way valve dischargeable into the pressure compensating reservoir, wherein the brake pressure generator comprises a master brake cylinder including working chambers to which the wheel brakes are connected and including master cylinder valves connecting the working chambers to the pressure compensating reservoir, wherein the master cylinder valves are in the form of regulating valves adapted to limit the auxiliary pressure to a value in proportion to a pedal force, wherein the master cylinder valves define regulating central valves, through which, pressure fluid from the auxiliary pressure supply system passes to restore master cylinder pistons in the master cylinder into an initial position, said pressure fluid is dischargeable into the pressure compensating reservoir, thereby permitting the pressure in the working chambers to be limited to the value in proportion to the pedal force, and wherein differential pressure switches are provided in said working chambers, said pressure switches measure the pressure in the working chamber, said switches coupled to said circuit means to compare the measure pressure with the auxiliary pressure and which, with the separating valves closed, controls the auxiliary pressure supply system to achieve desired auxiliary pressure, in the respective hydraulic circuits of the auxiliary pressure supply system in response to the pressure in the master cylinder working chambers.

* * * * *